(12) United States Patent  
Fortin

(10) Patent No.: US 7,510,232 B2  
(45) Date of Patent: Mar. 31, 2009

(54) BUMPER WITH AN OVERRIDE FEATURE

(75) Inventor: Hugo F. Fortin, Commerce Township, MI (US)

(73) Assignee: Nissan Technical Center North America, Inc., Farmington Hills, MI (US)

(*) Notice: Subject to any disclaimer, the term of this patent is extended or adjusted under 35 U.S.C. 154(b) by 120 days.

(21) Appl. No.: 11/096,631

(22) Filed: Apr. 1, 2005

(65) Prior Publication Data

US 2006/0220399 A1    Oct. 5, 2006

(51) Int. Cl.  
*B60R 19/44* (2006.01)

(52) U.S. Cl. ............................. 296/143; 296/102

(58) Field of Classification Search ........... 293/143  
See application file for complete search history.

(56) References Cited

U.S. PATENT DOCUMENTS

| 4,397,490 A | 8/1983 | Evans et al. |
| 6,318,773 B2 * | 11/2001 | Storer ........................ 293/115 |
| 6,474,708 B1 | 11/2002 | Gehringhoff et al. |
| 2001/0035658 A1 * | 11/2001 | Anderson et al. ........... 293/120 |
| 2002/0047281 A1 | 4/2002 | Hartel et al. |
| 2002/0129981 A1 | 9/2002 | Satou |
| 2004/0036302 A1 * | 2/2004 | Shuler et al. ................ 293/120 |
| 2004/0130167 A1 * | 7/2004 | Mori et al. .................. 293/102 |

* cited by examiner

*Primary Examiner*—Joseph D Pape  
(74) *Attorney, Agent, or Firm*—Young Basile

(57) ABSTRACT

A bumper with an override feature for a vehicle has at least one impact resisting member having at least one bumper beam with a bumper face and at least one override member having at least one override face extending from the bumper beam to increase an effective face area of the bumper beam.

28 Claims, 16 Drawing Sheets

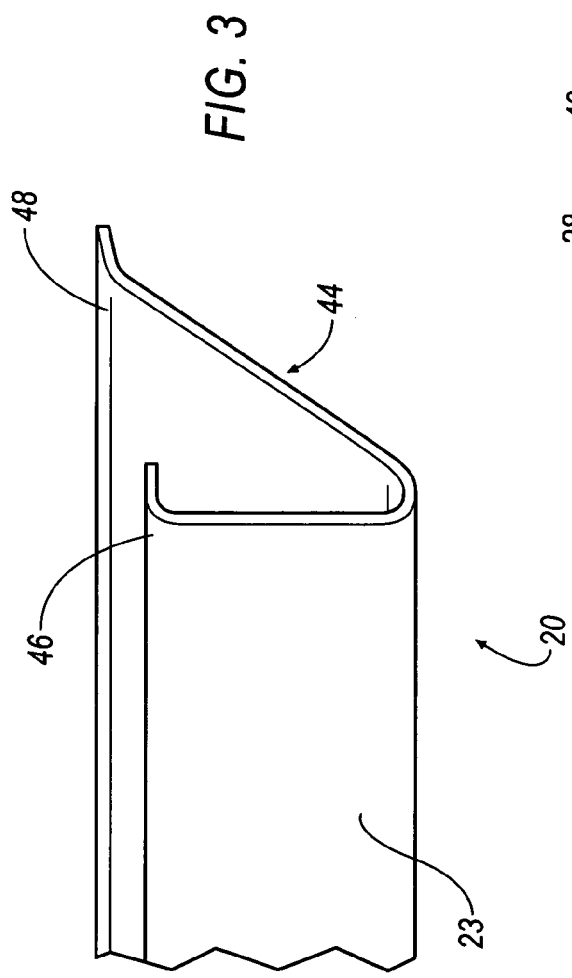
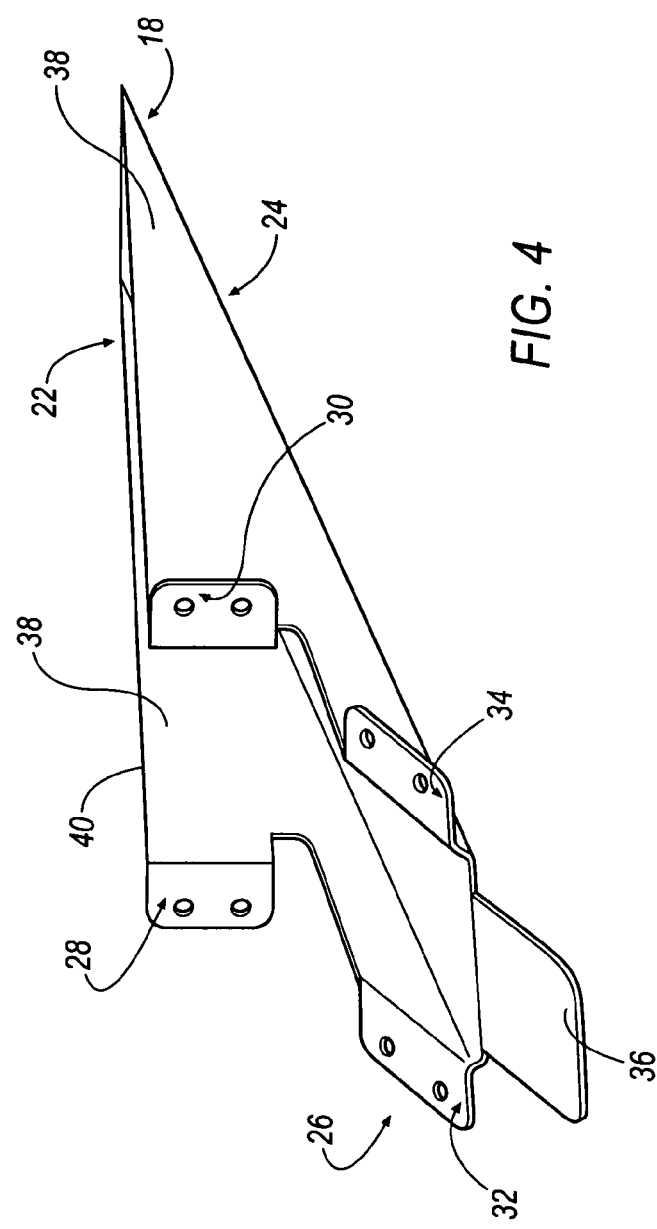

BUMPER WITH AN OVERRIDE FEATURE

BACKGROUND

Many vehicles are equipped with bumpers for absorbing impact and protecting the vehicle and its passengers from damage and injury. Commonly, bumpers are positioned at the front or the rear of the vehicle.

BRIEF DESCRIPTION OF THE DRAWINGS

The present invention will now be described, by way of example, with reference to the accompanying drawings, in which:

FIG. 3 is a perspective view of a component for a bumper with an override feature according to an embodiment of the present invention;

FIG. 4 is a perspective view of a component for a bumper with an override feature according to an embodiment of the present invention;

DETAILED DESCRIPTION

Figure 1:
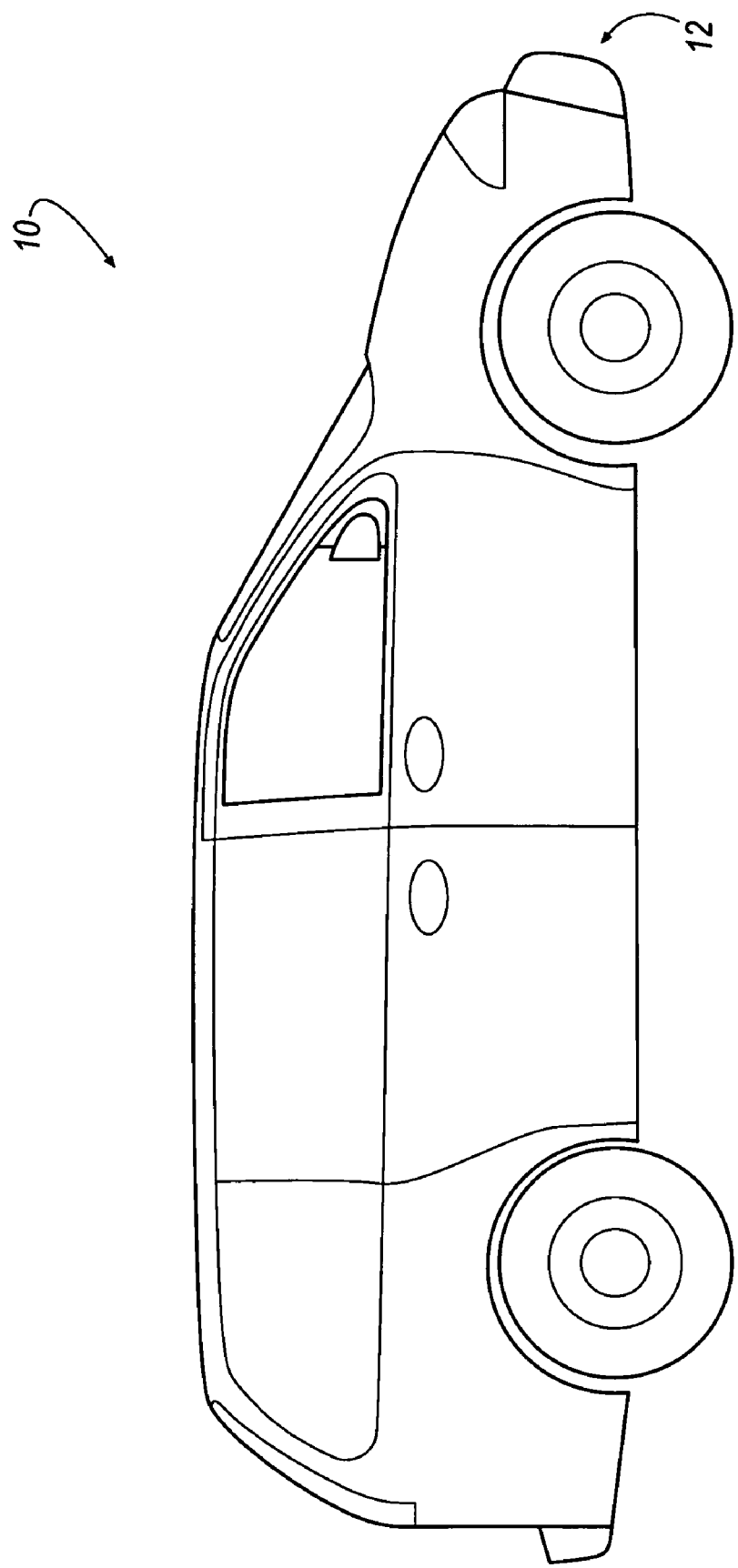
FIG. 1 is a schematic view of a vehicle having a bumper with an override feature according to an embodiment of the present invention.

Referring now to FIG. 1, a schematic view of a vehicle 10 is shown having a bumper with an override feature 12. Although the bumper with an override feature 12 is shown positioned at a front end of the vehicle 10, it will be readily understood that the bumper with an override feature 12 may be positioned at a rear end of the vehicle 10 or at any other location on the vehicle 10 suitable for absorbing impact.

Figure 2:
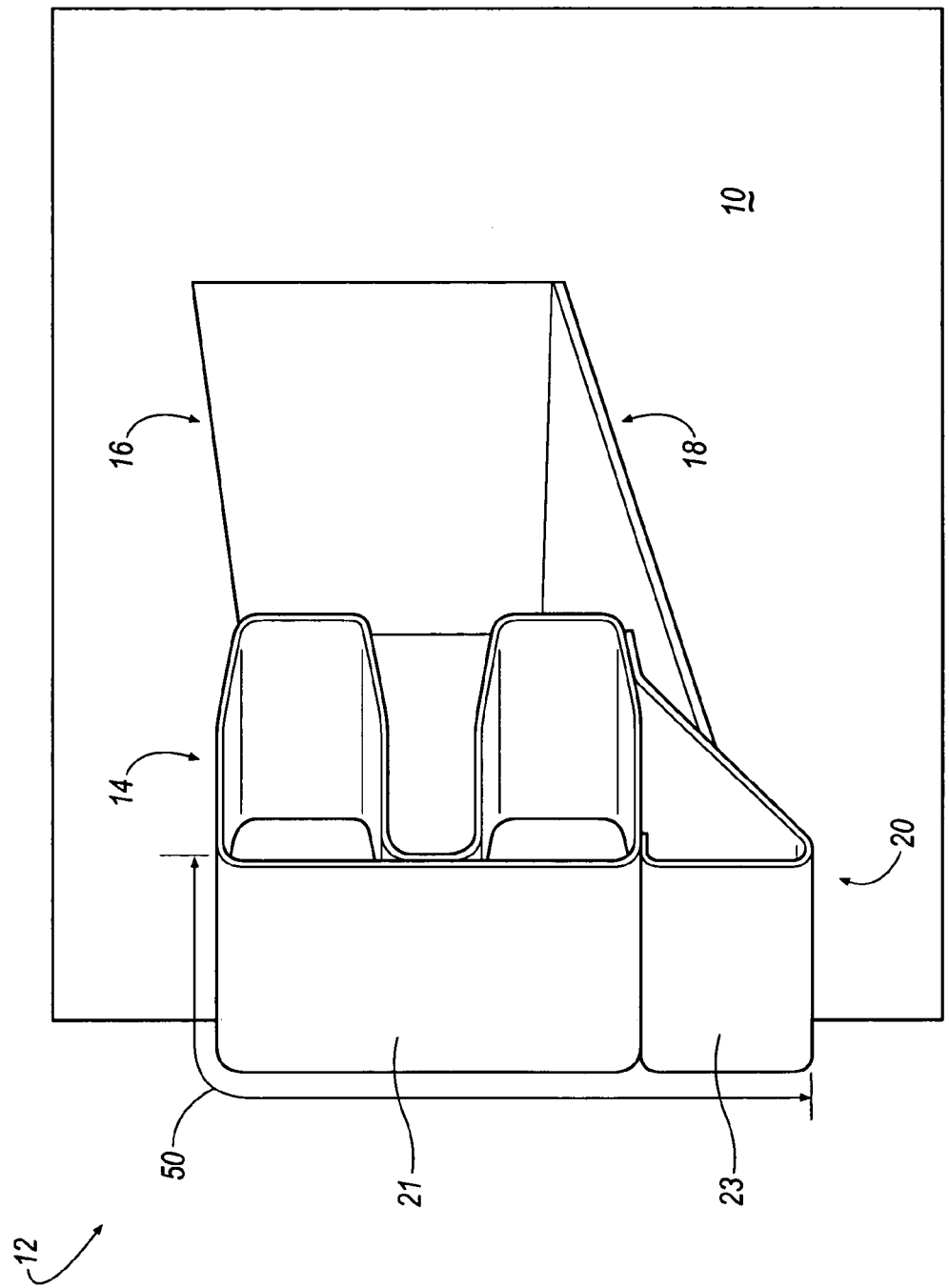
FIG. 2 is a perspective view of a bumper with an override feature according to an embodiment of the present invention.

Referring now to FIG. 2, an embodiment of a bumper with an override feature 12 is shown in greater detail. In FIG. 2, the illustrated override feature 12 generally includes a bumper beam 14 having a bumper face 21, a bumper support member 16 that supports the bumper beam 14, an override support member 18, and an override face 20.

As shown in FIG. 3, the override face 20 generally includes a face region 23, back support 44, and connection areas 46 and 48. In one embodiment, the back support 44 and face region 23 define a generally hollow interior portion. Of course, it will be understood to one skilled in the art that the override face 20 may define a solid or other suitable interior portion. The override face 20 is attached to the bumper beam 14 at connection areas 46 and 48. The connection of the override face 20 to the bumper beam 14 at connection areas 46 and 48 may be accomplished through any known connecting means such as welding or bolting. In an embodiment, the connection of the override face 20 to the bumper beam 14 provides resistance to impacts against the override face 20. More specifically, the resilience of the connection between the override face 20 and the bumper beam 14 provides resistance to shearing, destruction, deformation and other potential destructive results caused to the override face 20 by an impact thereagainst (as will be described in greater detail).

Figure 2A:
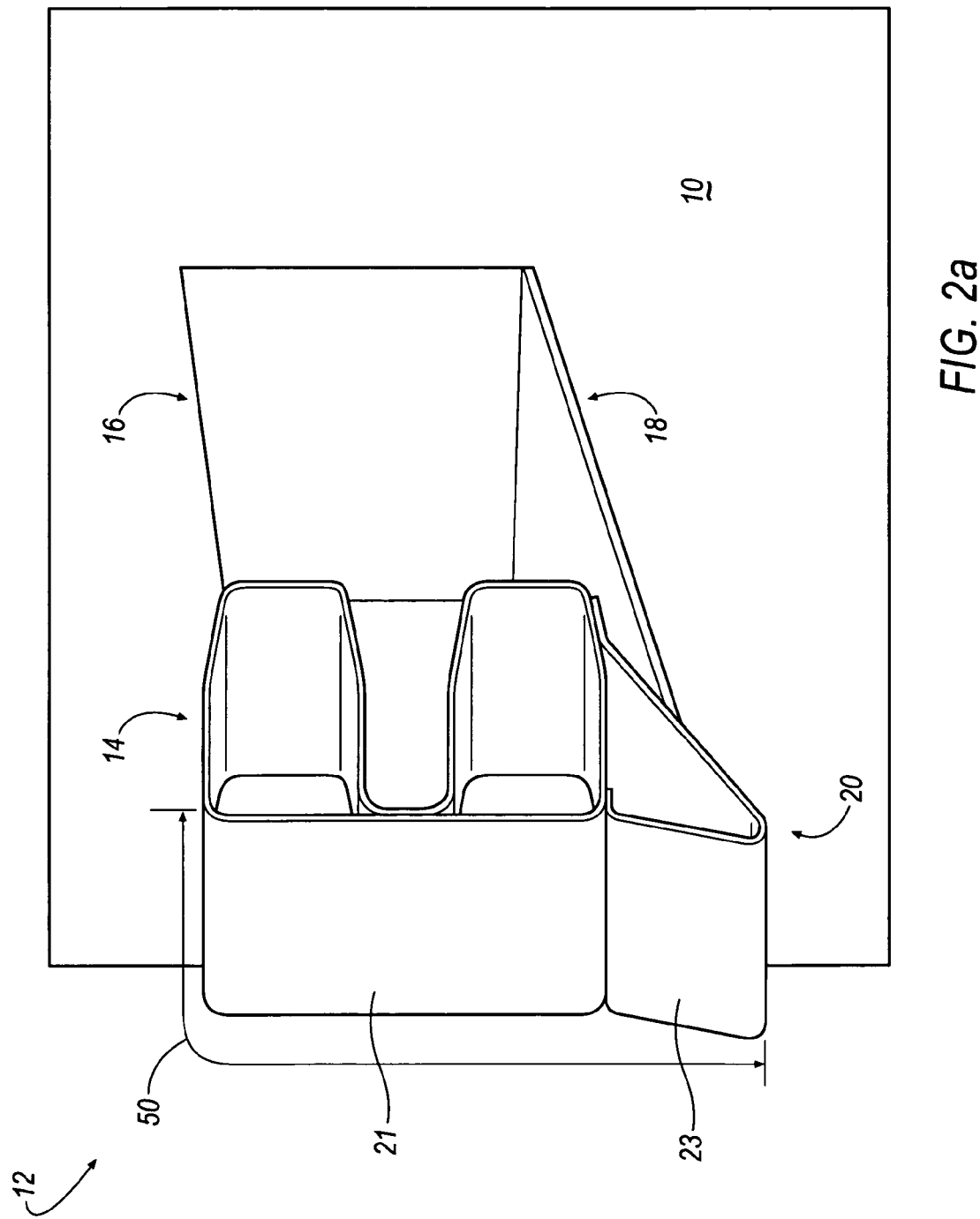
FIG. 2a is a perspective view of a bumper with an override feature according to an embodiment of the present invention.

As shown in FIG. 2, the bumper beam 14 generally includes a bumper face 21. The bumper face 21 and the face region 23 combine to form an effective face area 50 that provides an effective area for receiving an impact as will be described in greater detail hereinafter. It should be noted that, although the bumper face 21 and face region 23 are shown as flat surfaces, the bumper face 21 and face region 23 can be any contoured or geometrical surface suitable for receiving an impact (as will be discussed). In one embodiment, as shown in FIG. 2, the bumper face 21 and the face region 23 are coplanar or substantially coplanar. Of course, it will be understood that bumper face 21 and face region 23 do not have to be coplanar. In the embodiment shown in FIG. 2, the angular orientation of the face region 23 may be at the same angle as the bumper face 21. Or, the face region 23 may be angled toward the bumper beam to deflect an impact against the face region 23 toward the bumper beam 14 as shown in FIG. 2a (also see the example shown in FIGS. 14 and 15).

Referring to FIG. 4, the override support member 18 is described in greater detail. As shown in FIG. 4, the override support member 18 generally includes a first portion 22, a second portion 24 that is angled from the first portion 22, and a third portion 26. Additionally, wall surfaces 38 provide side regions that are connected between the first portion 22 and the second portion 24. The override support member 18 provides additional impact resistance to the override face 20 from an impact imparted upon the override face 20 (as will be discussed in greater detail).

As shown in FIGS. 2 and 4, in an embodiment, the first portion 22 generally connects to the bumper support member 16. In an embodiment, the connection of the first portion 22 to the bumper support member 16 has a lower strength than a crush resistance of the bumper support member 16. By this way, the first portion 22 breaks away from the bumper support member 16 before the bumper support member 16 begins to crush.

In another embodiment, the strength of the connection between the first portion 22 and the bumper support member 16 is greater than the crush resistance of the bumper support member 16. By this way, during an impact against the override face 20, as will be discussed in greater detail, the connection between the first portion 22 and the bumper support member 16 fails before the bumper support member 16 begins to crush. In this way, crushing of the bumper support member 16 absorbs impact against the override face 20.

The third portion 26 includes connection members such as tabs 28, 30, 32 and 34 for connecting the override support member 18 to the bumper support member 16 and override face 20. As shown, tabs 32 and 34 are angled to fit against back support 44. Differently, tabs 28 and 30 are positioned to fit against a back area of the bumper beam 14. However, it should be noted that tabs 28, 30, 32 and 34 may have any angular orientation, and the present invention is not limited to that disclosed herein. Tabs 28 and 30 connect to a back region of the bumper beam 14 while tabs 32 and 34 connect to the back support 44 of the override face 20. In an embodiment, the angle of the second portion and the lengths of the first portion and second portion assists in preventing override face 20 from rotating in response to an impact. More specifically, the angle of the second portion and the angle of the tabs 28 and 30 lend additional support to a lower most region of the override face 20. As a result, this increased support reduces the tendency of the override face 20 to rotate in response to an impact.

Figure 5:
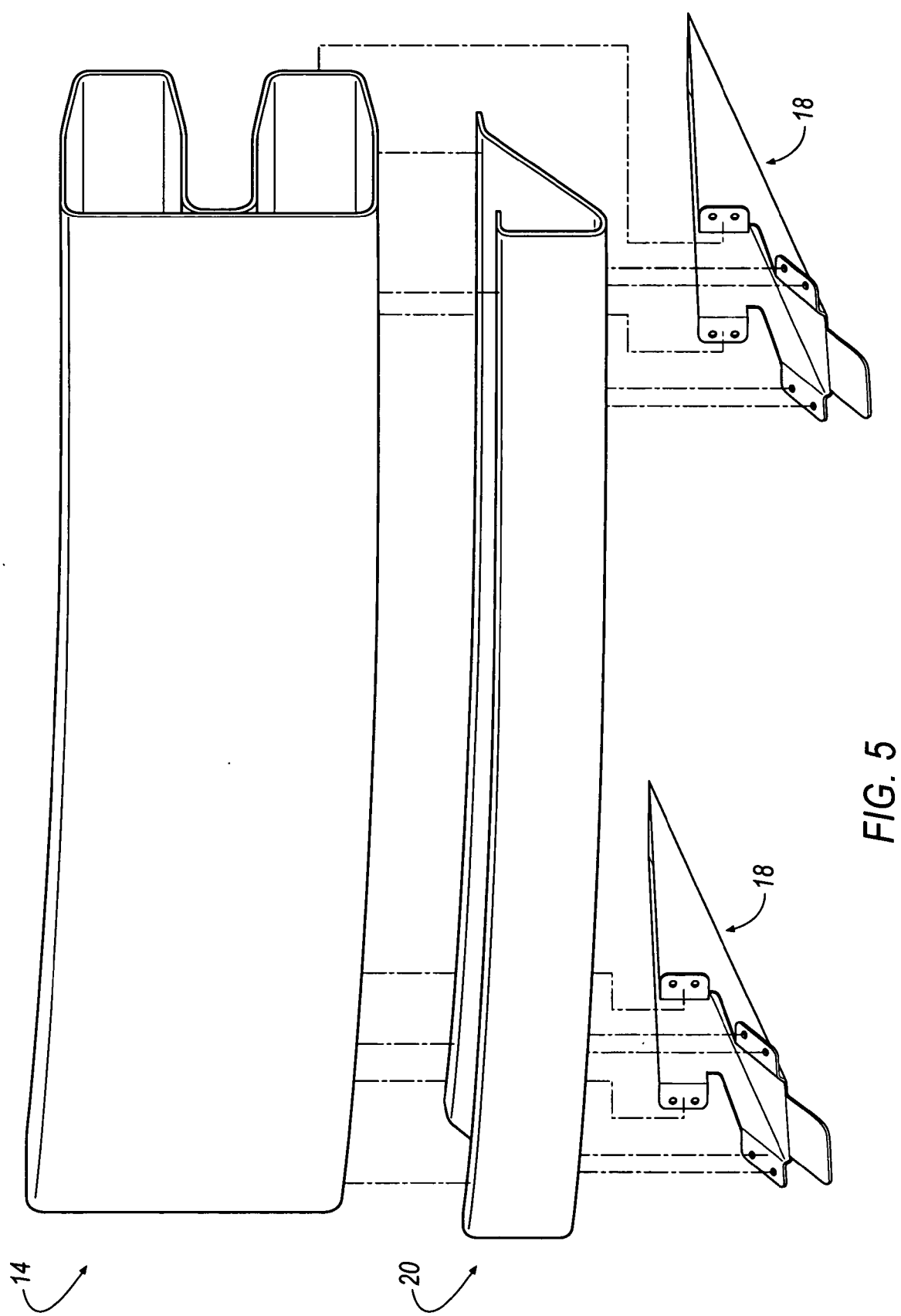
FIG. 5 is an exploded view of a bumper with an override feature according to an embodiment of the present invention.
Figure 6:
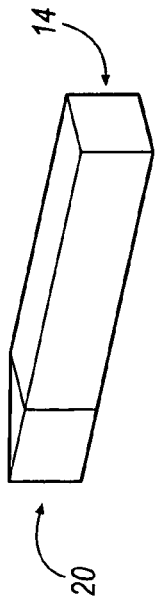
FIG. 6 is a schematic perspective view of a bumper with an override feature according to an embodiment of the present invention.

Referring now to FIG. 5, the override face 20 is shown in connection with multiple override support members 18. Here, the override support members 18 support the override face 20 at varying locations along the length of the override face 20. As previously discussed, the override face 20 connects to the bumper beam 14 while the override support members 18 connect to the override face 20 and bumper beam 14 through connection members such as tabs 32 and 34 and tabs 28 and 30 respectively. As shown in the Figure, the override support members 18 are positioned proximate either end of the bumper beam 14. However, it will be understood that any number of override support members 18 may be used and positioned at any location along the bumper beam 14.

Referring now to FIGS. 6-9, the bumper beam 14 is shown having an upper edge 62 and a lower edge 64. The upper edge 62 and lower edge 64 are shown in connection with an operational orientation of the vehicle. The operational orientation of the vehicle is the normal up and down orientation of the vehicle and associated components under normal usage, such as when the car is positioned on the road with one portion of the bumper up and one portion down. In this orientation, one edge (upper edge 62) is positioned at a higher elevational location with respect to a lower edge (lower edge 64).

With reference to FIGS. 6-9, example embodiments of the bumper with an override feature are shown and described. In the example shown in FIG. 6, the override face 20 is shown positioned adjacent to the upper edge 62. In this configuration, the override face 20 is positioned above the bumper beam 14 to intercept impacts arising from an upper elevational location with respect to the operational orientation of the vehicle.

Figure 7:
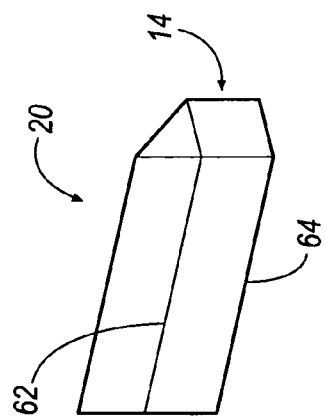
FIG. 7 is a schematic perspective view of a bumper with an override feature according to an embodiment of the present invention.

Similarly, in FIG. 7, the override face 20 is positioned at opposite ends of the bumper beam 14. In this configuration, the override face 20 is located to intercept impacts arising at outer ends of the vehicle.

Figure 8:
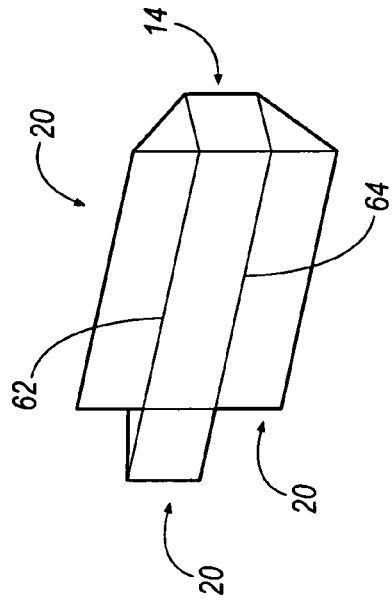
FIG. 8 is a schematic perspective view of a bumper with an override feature according to an embodiment of the present invention.

As shown in FIG. 8, override faces 20 are shown positioned adjacent to upper edge 62 and lower edge 64 to intercept impacts arising from either upper or lower elevational locations with respect to the vehicle.

Figure 9:
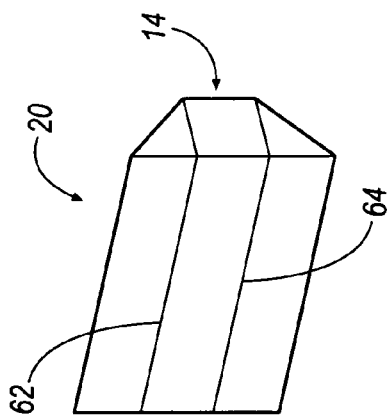
FIG. 9 is a schematic perspective view of a bumper with an override feature according to an embodiment of the present invention.

FIG. 9 illustrates override faces 20 positioned at all outer edges of the bumper beam 14. One skilled in the art will readily recognize that other configurations that may be used in accordance with embodiments of the present invention. Additionally, one will readily recognize that other embodiments may be configured and positioned according to the examples shown and described in FIGS. 6-9.

Figure 10:
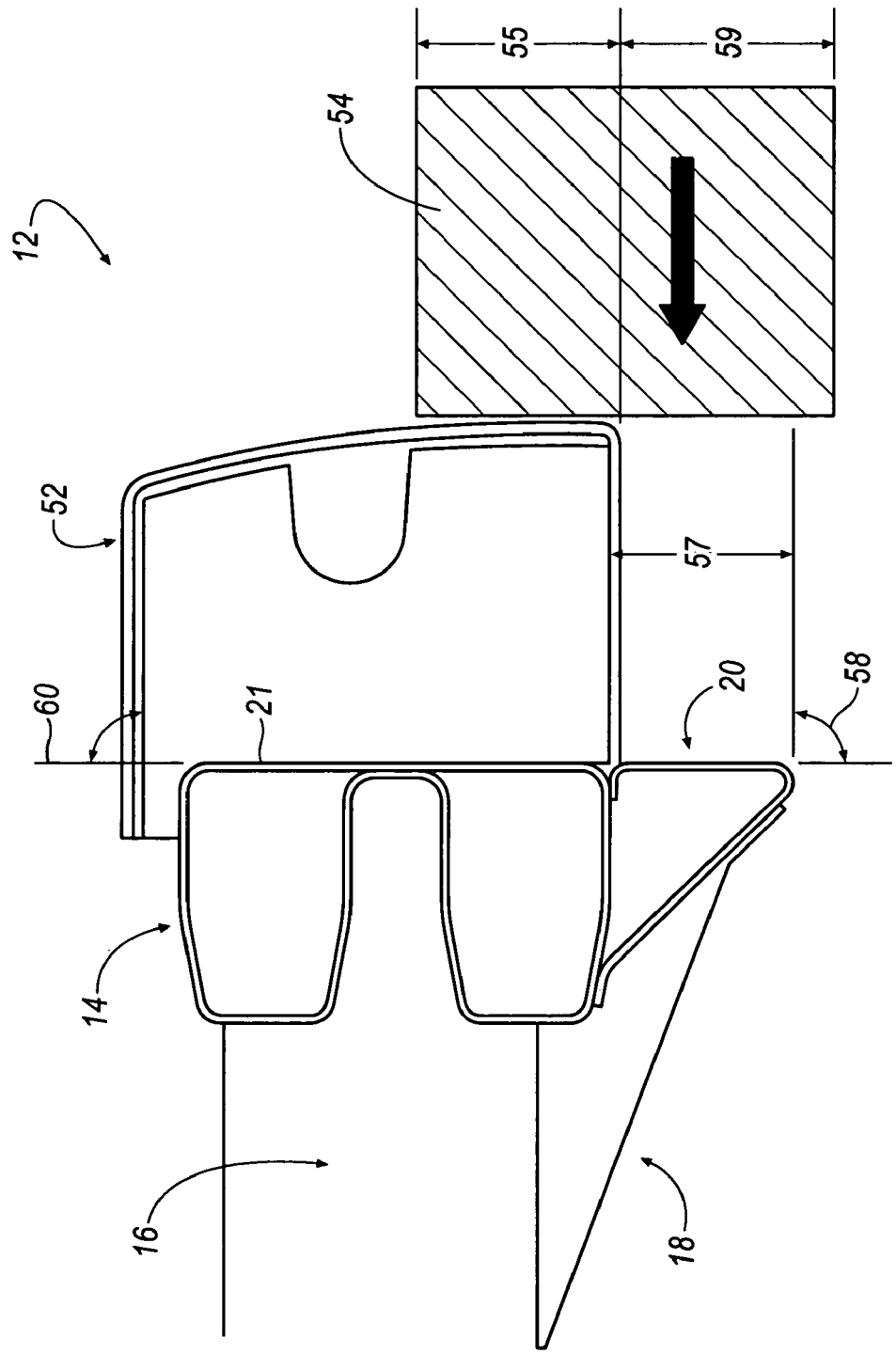
FIG. 10 is a side view of a bumper with an override feature according to an embodiment of the present invention.
Figure 11:
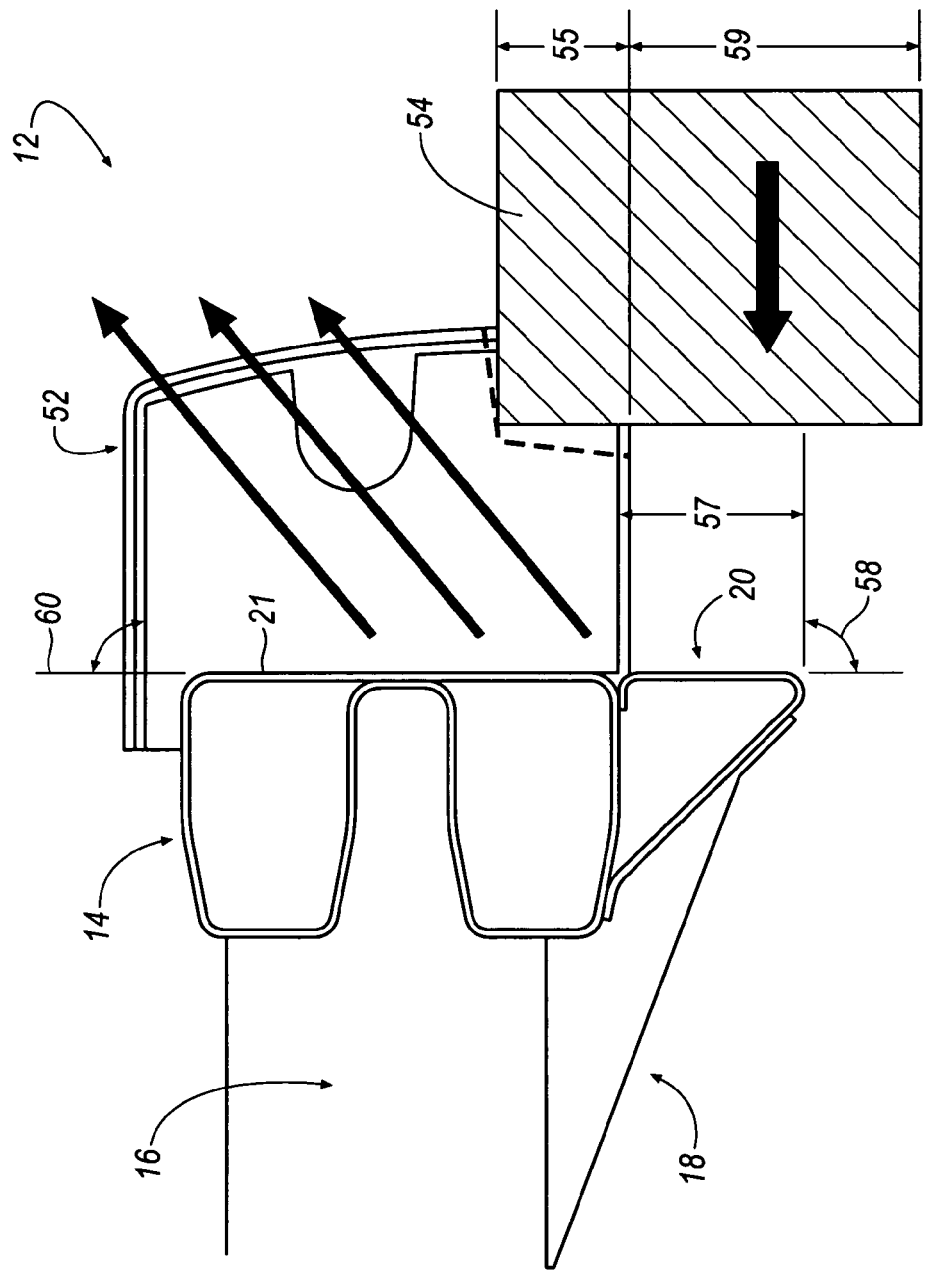
FIG. 11 is a side view of a bumper with an override feature according to an embodiment of the present invention.
Figure 12:
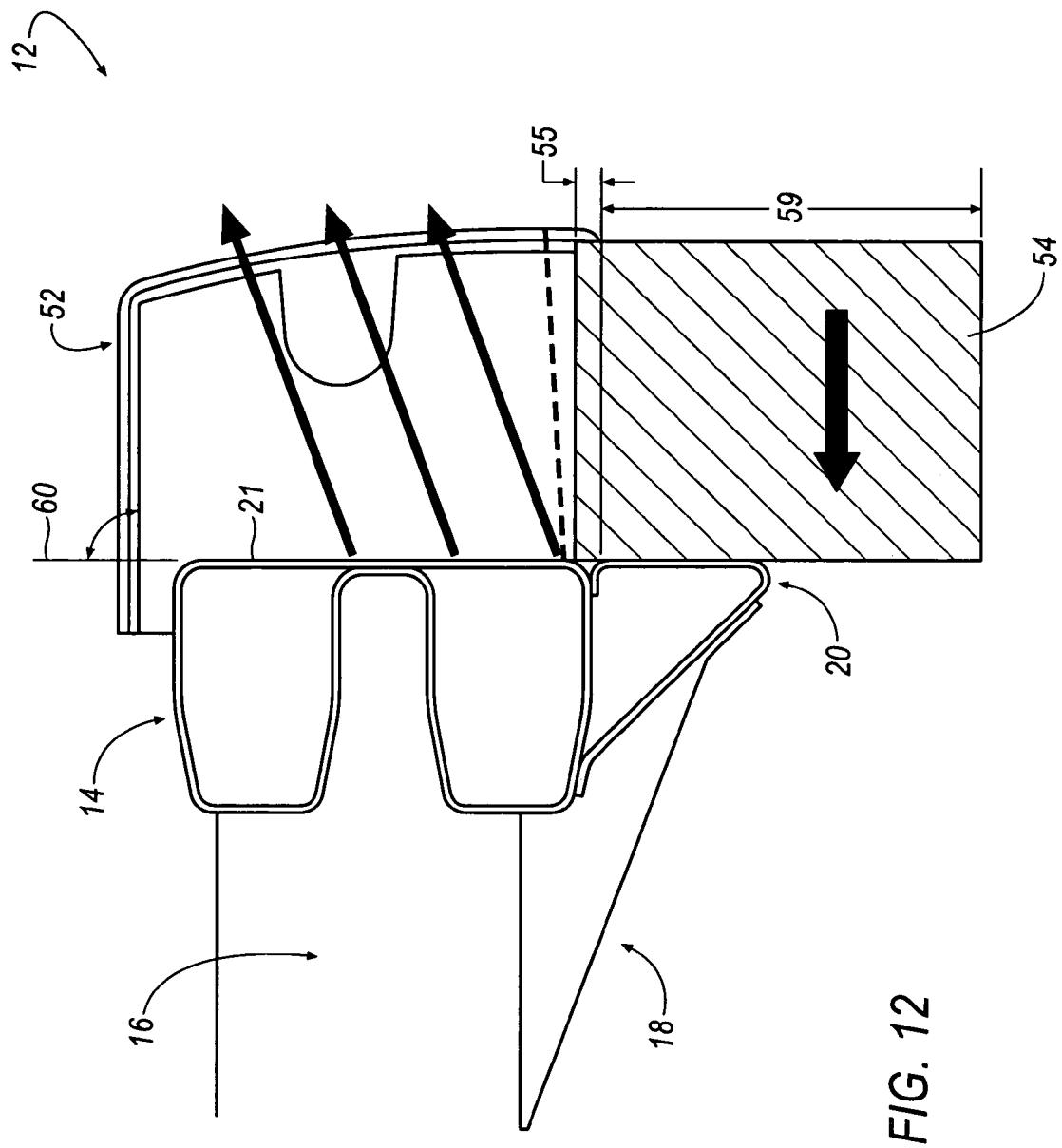
FIG. 12 is a side view of a bumper with an override feature according to an embodiment of the present invention.

Referring now to FIGS. 10-12, the operation of an embodiment of the present invention is shown and described. In FIG. 10, a bumper with an override feature 12 is shown positioned behind a fascia 52. The bumper with an override feature 12 is shown receiving an impact from an object 54. The object 54 may be the bumper of another vehicle, a fixed object or any other subject of a collision. In an embodiment, the lower surface of the fascia 52 is substantially horizontal such that it does not redirect a force of impact toward the override face 12 instead of the bumper beam 14.

The bumper face 21 of the bumper beam 14 generally defines an effective area of the bumper beam 14 for receiving the impact from the object 54. As shown, the object 54 overlaps with the bumper face 21 of the bumper beam 14 by an overlap distance 55. A remaining amount 59, however, extends below the bumper face 21.

In FIG. 10, the object 54 closes distance with the fascia 52. In FIG. 11, the object 54 begins impacting the fascia 52. As a result of this impact between the fascia 52 and the object 54, a force is generated on the fascia 52 in an upward direction. As shown in FIG. 12, the upward direction of the force generated on the fascia 52 moves the bumper beam 14 in an upward direction over the object 54. As the bumper beam 14 moves in a direction over the object 54, however, the override face 20 impacts an upper region of the object 54. This impact between the override face 20 and the object 54 provides impact resistance by transferring the load to the bumper beam 14 and bumper support member 16 and preventing the impact resisting regions from missing each other during a collision. More specifically, without the override face 20, the object 52 would be free to travel under the vehicle, thereby bypassing the bumper beam 14 and possibly impacting other less impact resistant portions of the vehicle. It will be understood that the term impact resistance may apply to any known means for absorbing, deflecting, resisting or otherwise protecting a vehicle or passenger from the effects of an impact. Additionally, when the embodiment shown in FIG. 2a undergoes the operation as described above, the angled override face 20 redirects the force of the impact toward the bumper beam 14.

Figure 13A:
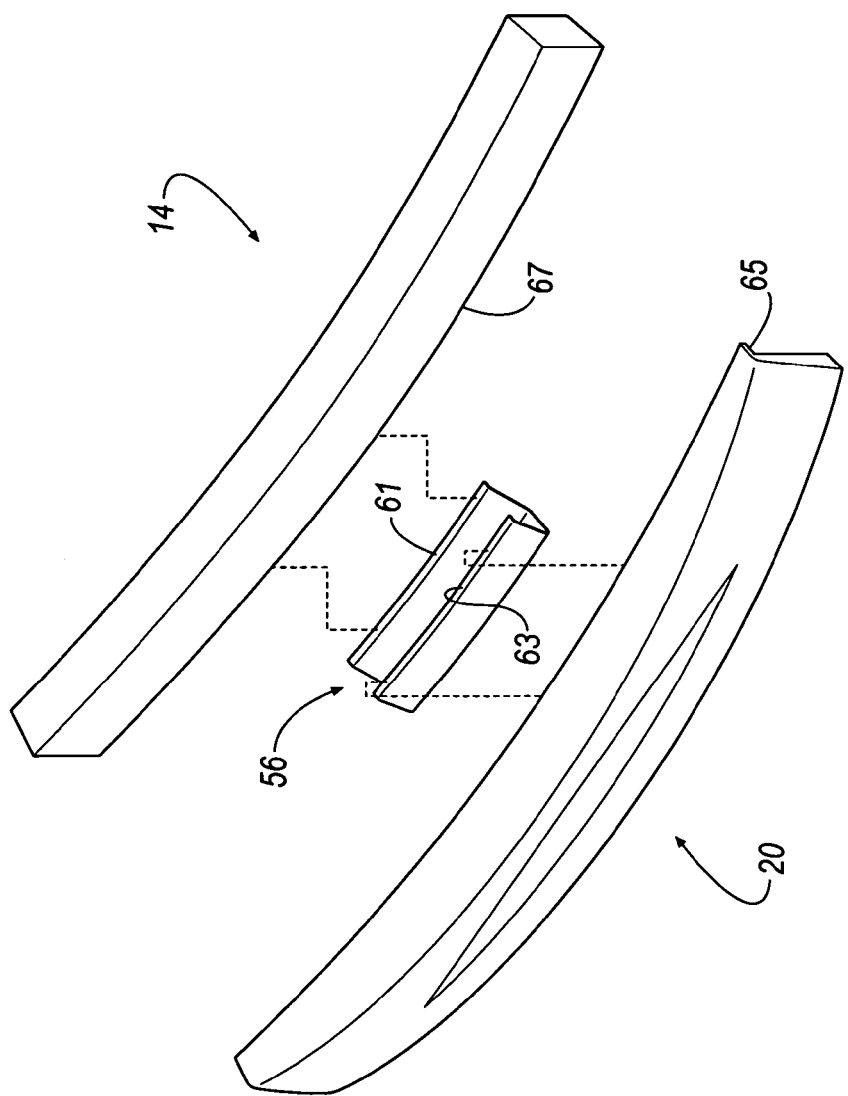
FIG. 13a is an exploded view of a bumper with an override feature according to an embodiment of the present invention.
Figure 13B:
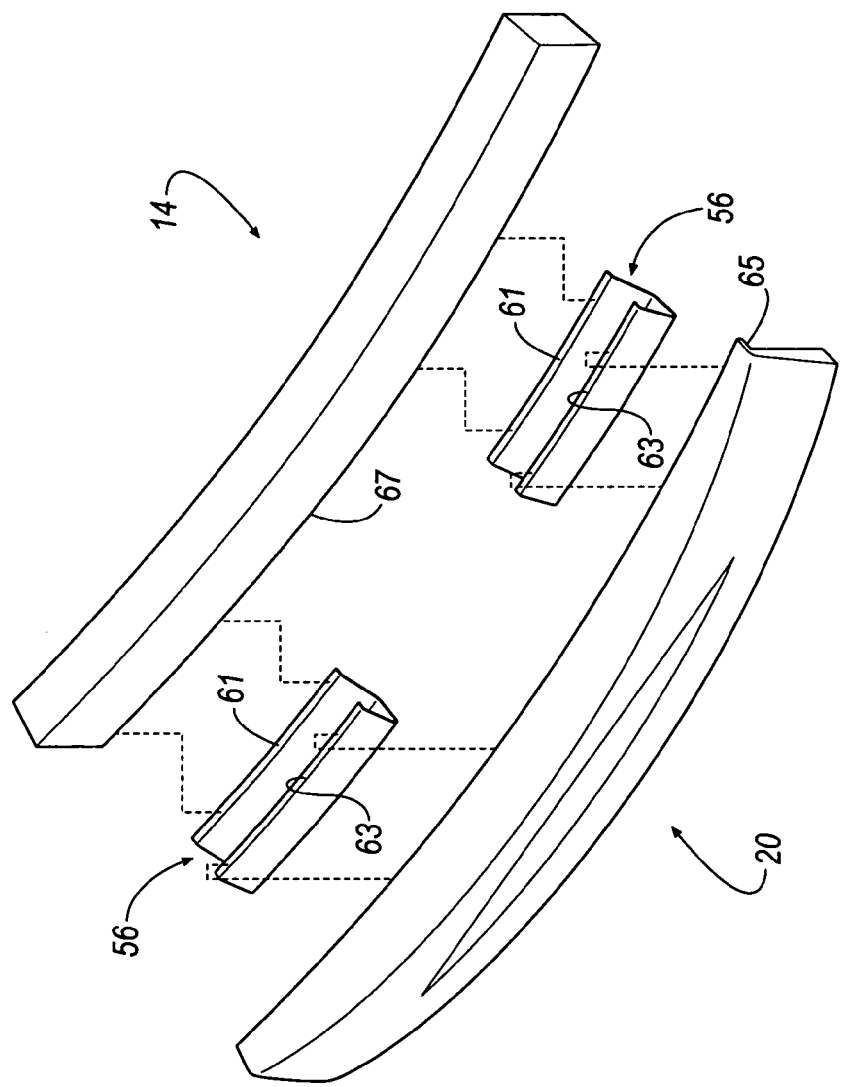
FIG. 13b is an exploded view of a bumper with an override feature according to an embodiment of the present invention.

Referring now to FIGS. 13a and 13b, another embodiment of the present invention is shown and described. In FIG. 13a, another embodiment of an override face 20 is shown attached to the bumper beam 14 by a connector 56. As shown, surface 61 of the conector 56 connects to bottom portion 67 of the bumper beam 14. Surface 63, in turn, connects to a lower portion of an edge 65 of the override face 20. The connector 56 positions the override face 20 at a location below the bumper beam 14. The connector 56, in addition to acting as an override support member and providing additional support for the override face 20, creates a space between the override face 20 and the bumper beam 14 allows airflow to pass between the bumper beam 14 and override face 20 for cooling a radiator or other similar device. The override face 20 can also be angled or coplanar similar to that discussed with respect to the embodiments described in FIGS. 2 and 2a.

In FIG. 13b, connectors 56 are shown as two separate elements positioned proximate ends of the bumper beam 14 and override face 20. Similar to the previous embodiment, connectors 56 provide a space between the override face 20 and bumper beam 14 to allow airflow to pass therethrough.

In operation, as described with respect to FIGS. 10-12, the override face 20 impacts an upper region of an object, such as object 54 (see FIG. 12). This impact between the override face 20 and the object provides impact resistance by transferring the load to the bumper beam 14 and bumper support member 16 and preventing the impact resisting regions from missing each other during a collision.

Figure 14:
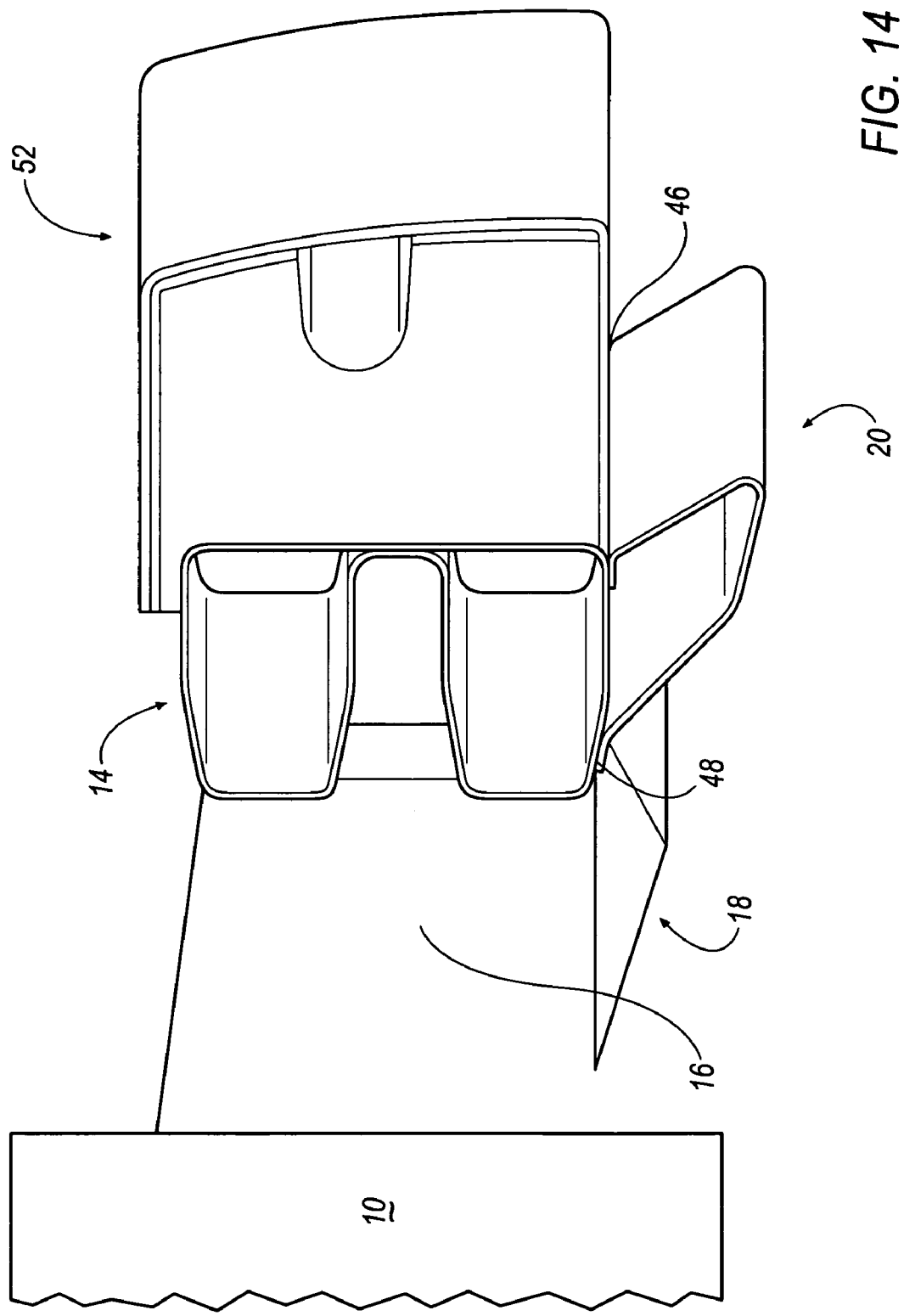
FIG. 14 is a perspective view of a bumper with an override feature according to an embodiment of the present invention.
Figure 15:
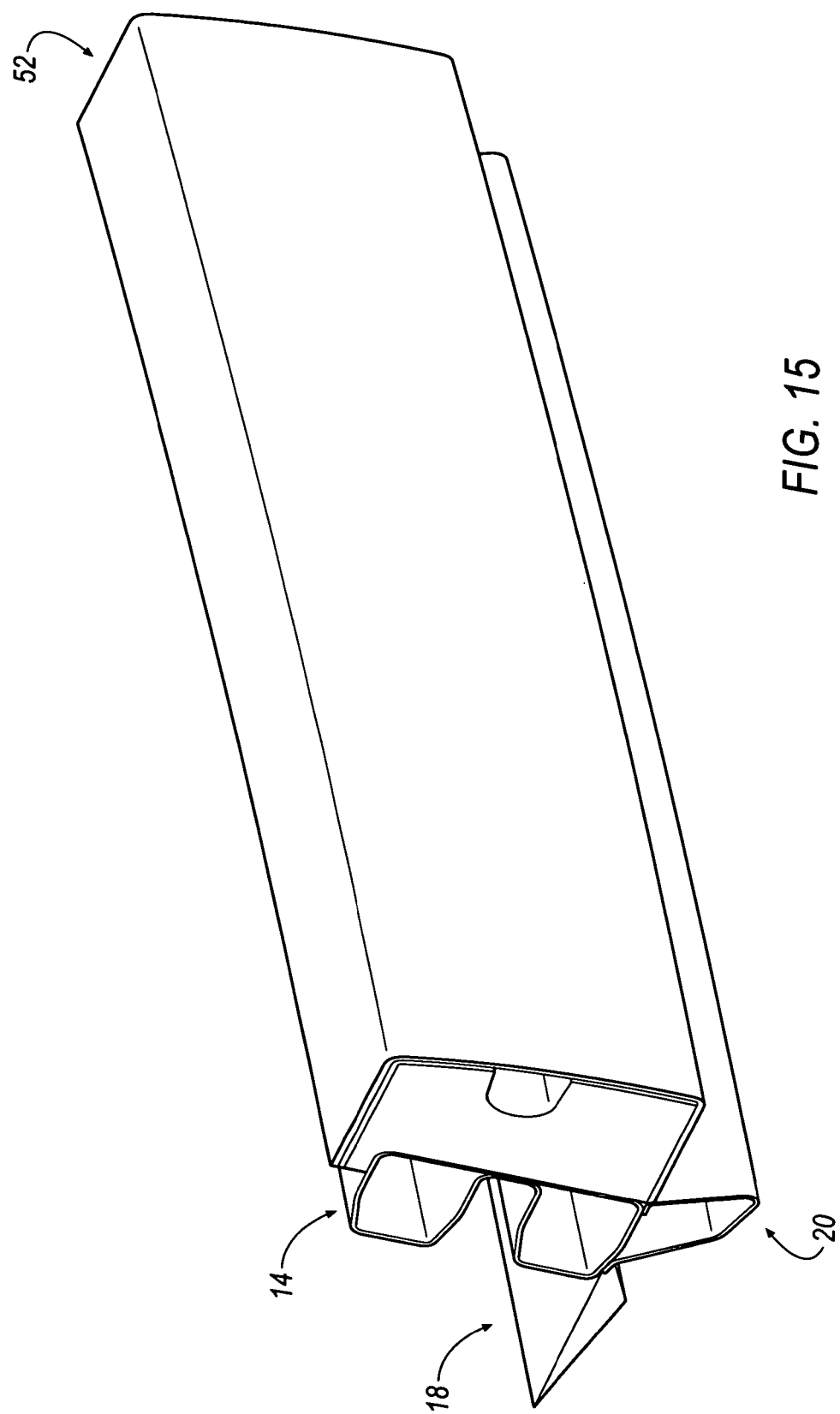
FIG. 15 is a perspective view of a bumper with an override feature according to an embodiment of the present invention.

Referring now to FIGS. 14 and 15, another embodiment of the present invention is shown and described. In FIGS. 14 and 15, the override face 20 is shown as an impact-absorbing member. As will be discussed greater detail, the impact-absorbing member provides impact resistance by deforming and absorbing an impact. The override face 20 is constructed of a movable or somewhat flexible material such as sheet metal that is able to move or deform in response to an impact. Of course, as will be understood by one skilled in the art, other suitable materials may also be used for the override face 20.

In the example described with reference to FIGS. 14 and 15, the override face 20 is attached to the bumper beam 14 and the fascia 52. However, it will be understood that the override face 20 may be attached entirely to the fascia 52 or the bumper beam 14. An override support member 18 is position behind the override face 20 and is connected to the bumper beam 14 and the bumper support member 16.

Figure 16:
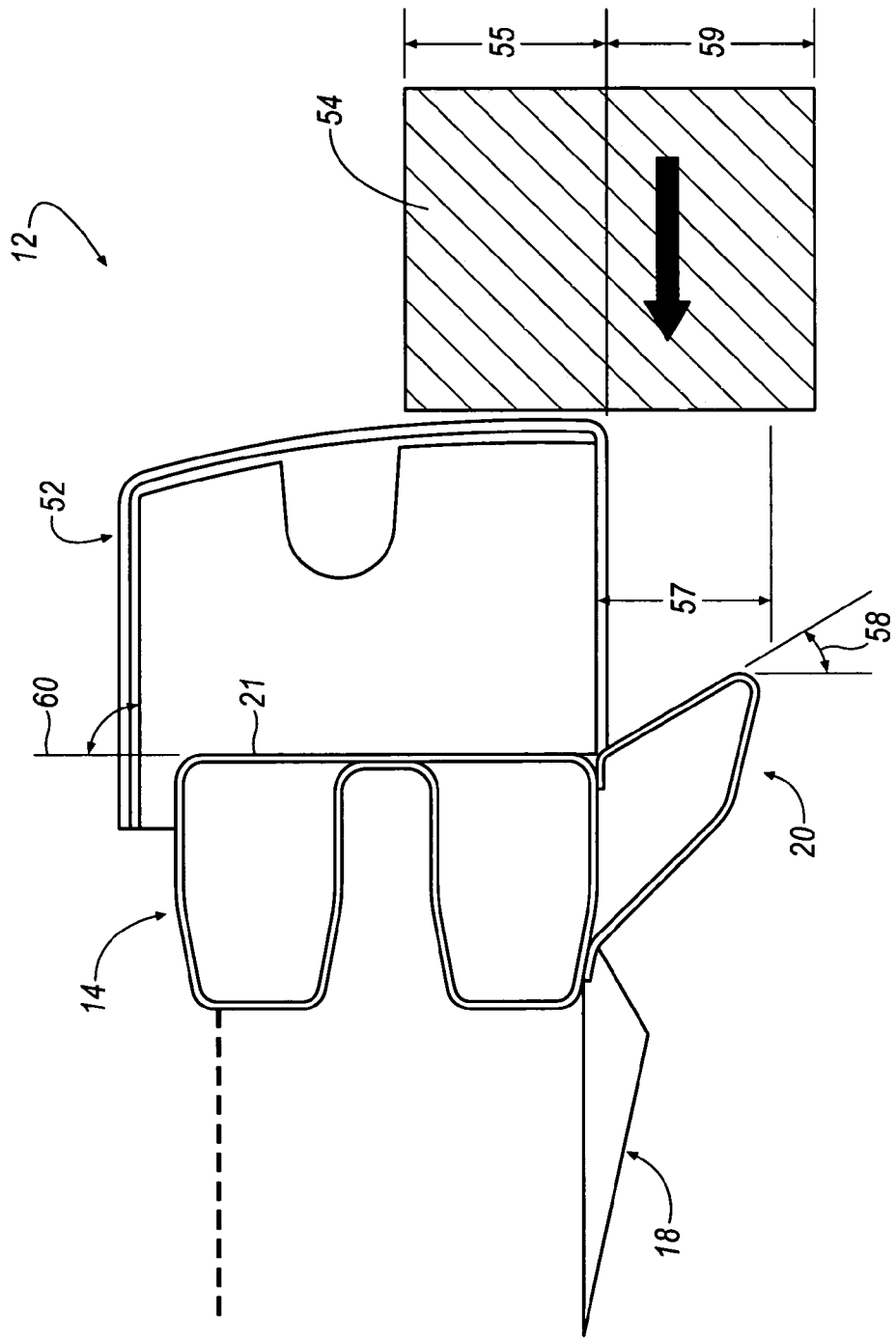
FIG. 16 is a side view of a bumper with an override feature according to an embodiment of the present invention.
Figure 17:
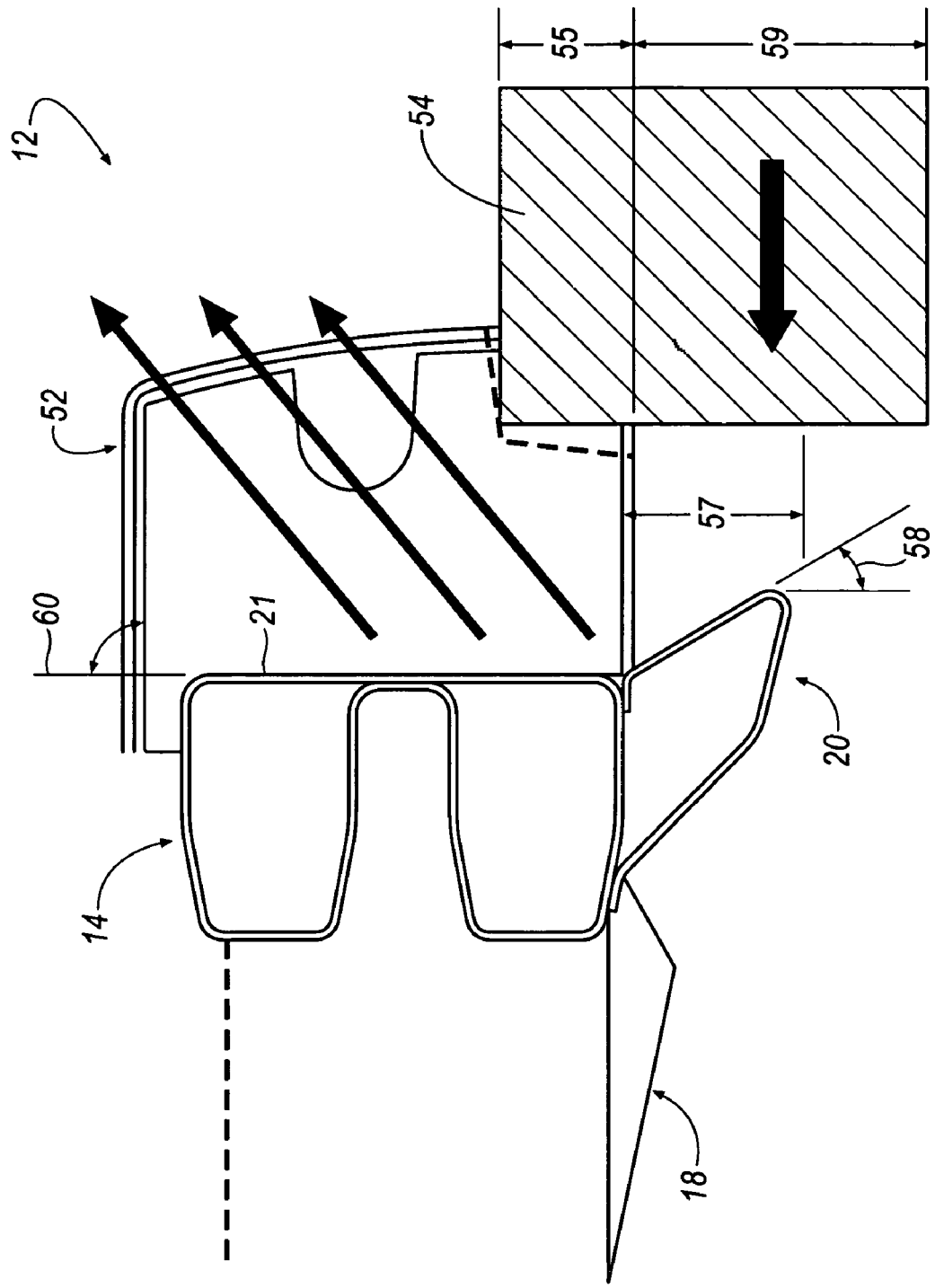
FIG. 17 is a side view of a bumper with an override feature according to an embodiment of the present invention.
Figure 18:
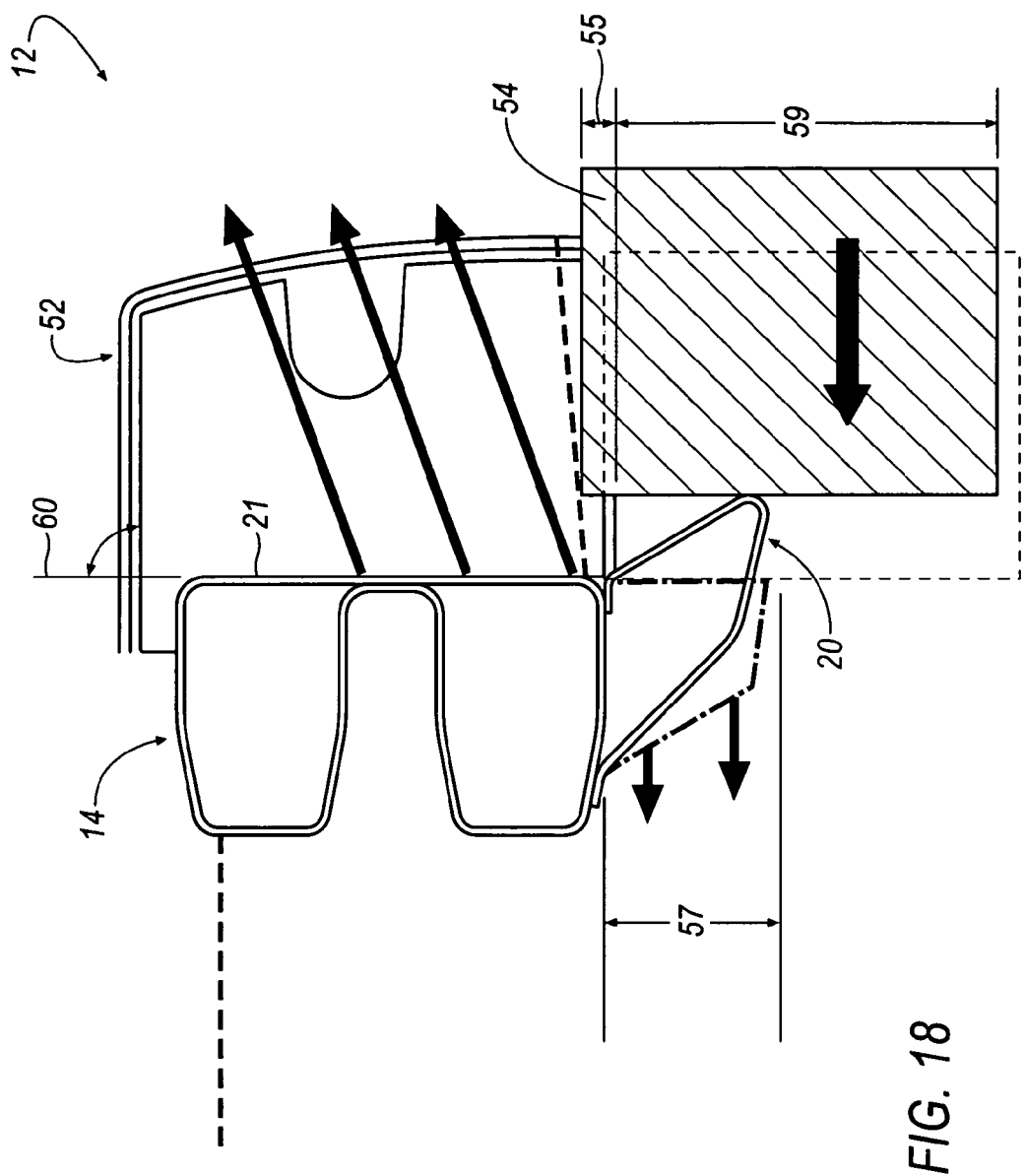
FIG. 18 is a side view of a bumper with an override feature according to an embodiment of the present invention.

Referring now to FIG. 16-18, an operation of an embodiment of the present invention is shown and described. In FIG. 16, the object 54 closes distance with the fascia 52. In FIG. 17, the object 54 begins impacting the fascia 52. As a result of this impact, a force is generated on the fascia 52 in an upward direction. As shown in FIG. 17, the upward direction of the force generated on the fascia 52 moves the bumper beam 14 in an upward direction over the object 54. As the bumper beam 14 moves in a direction over the object 54, however, the override face 20 impacts an upper region of the object 54. This impact between the override face 20 and the object 54 provides impact resistance by deforming and absorbing at least some of the impact energy received from the impact of the object 54.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A bumper with an override feature for a vehicle comprising: at least one impact resisting member comprising at least one bumper beam with a generally forward-facing bumper face; a fascia; at least one override member having at least one generally forward-facing override face positioned adjacent to the bumper face to increase an effective generally forward-facing face area of the bumper beam, wherein the bumper beam and override face are positioned rearward of the fascia; and a bumper support member providing impact resistance to the bumper face and further wherein the override support member provides less impact resistance than the bumper support member.

2. The bumper according to claim 1, wherein the override support member comprises: a first portion connected to a bumper support member; a second portion opposite of and angled with respect to the first portion; and a third portion connected to the override member at a position adapted to resist the impact force against the override face member.

3. The bumper according to claim 1, wherein the override member is an impact-absorbing member.

4. The bumper according to claim 1, wherein: the override support member and the override face are an integral component; the integral component comprises a sheet material connected to the bumper beam that is adapted to deform upon receiving the impact force.

5. The bumper according to claim 2, wherein an angle of the second portion is adapted to resist rotational movement of the override face.

6. The bumper according to claim 1, further comprising: at least a first override support member and a second override support member; wherein the bumper beam has a first end and a second end; wherein the first override support member is proximate the first end and the second override support member is proximate the second end; and wherein an air passage is formed by a space between the first override support member, the second override support member, the bumper beam and the override member.

7. The bumper according to claim 1, wherein the fascia further comprises a surface proximate the override member that is substantially horizontal with respect to an operational orientation of the bumper.

8. The bumper beam according to claim 1, wherein: the bumper beam comprises an upper edge and a lower edge with respect to an operational orientation of the bumper beam; and the override face member is positioned adjacent to the upper edge to increase the effective face area of the bumper beam at the upper edge.

9. The bumper according to claim 1, wherein: the bumper beam comprises an upper edge and a lower edge with respect to an operational orientation of the bumper beam; and the override member is positioned adjacent to the lower edge to increase the effective face area of the bumper beam at the lower edge.

10. The bumper according to claim 1, wherein the override member is connected to the bumper beam.

11. The bumper according to claim 1, wherein the override face has an angular orientation angled toward the bumper beam with respect to an angular orientation of the bumper face to divert at least a portion of the impact force toward the bumper beam.

12. The bumper according to claim 1, further comprising: a connection member connecting the bumper beam to the override face; wherein a space is present between the bumper beam and the override member.

13. The bumper according to claim 10, wherein the override member is connected to the bumper beam in at least two locations.

14. The bumper according to claim 13, wherein the override member is connected to the bumper beam at first and second connection areas, wherein the first and second connection areas are substantially horizontal flange members.

15. The bumper according to claim 11, wherein a forward edge of the override face is positioned so as to extend forward of the bumper face of the bumper beam.

16. The bumper according to claim 15, wherein the forward edge of override face is positioned rearward of an outermost edge of a fascia.

17. A bumper assembly comprising:
- a bumper beam extending generally laterally across a vehicle end, the bumper beam having a generally vertical bumper face defining an outer surface of the bumper beam;
- an override member positioned adjacent to and coupled to the bumper beam, the override member having a generally vertical override face defining an outer surface of the override member, the override face cooperating with the bumper face to increase an effective generally vertical face area of the bumper beam;
- a fascia, the fascia positioned adjacent to at least one of the outer surface of the bumper beam and the override member and defining an outermost surface of the bumper assembly for selectively receiving an impact force;
- at least one bumper support; and
- at least one override support member, wherein the override support member is secured to the bumper support and further wherein the override support member provides less impact resistance than the bumper support member.

18. A bumper assembly according to claim 17, wherein the fascia substantially conceals both the outer surface of the bumper beam and the outer surface of the override member.

19. A bumper assembly according to claim 17, wherein the outer surface of the bumper beam and the outer surface of the override member are substantially coplanar.

20. A bumper assembly according to claim 17 wherein the outer surface of the override member is angled toward the outer surface of the bumper beam for diverting at least a portion of the impact force toward the bumper beam.

21. A bumper assembly according to claim 17, wherein the bumper beam and the bumper support are distinct components.

22. A bumper assembly according to claim 17, wherein the override support and the override member are an integral component.

23. A bumper assembly according to claim 17, wherein a connection is disposed between the override support and the bumper support, the connection failing prior to a crushing of the bumper support.

24. A bumper assembly according to claim 23, wherein the connection further includes a plurality of tabs, the tabs engaging the bumper support with the override support.

25. A bumper support assembly according to claim 23, wherein a connection strength between the override support member and the bumper support member is greater than a crush resistance of the bumper support member.

26. A bumper support assembly according to claim 17, wherein the fascia, the override member and the bumper beam are each impact-absorbing members, the fascia receiving the impact force prior to the override member and the bumper beam.

27. The vehicle bumper assembly according to claim 17, wherein the bumper beam and the override member are substantially parallel.

28. The vehicle bumper assembly according to claim 17, wherein the fascia selectively contacts at least one of the outer surface of the bumper beam and the override member.

* * * * *